(12) United States Patent
Gao

(10) Patent No.: US 11,546,894 B2
(45) Date of Patent: Jan. 3, 2023

(54) UPLINK CONTROL INFORMATION TRANSMITTING METHOD, UPLINK CONTROL INFORMATION RECEIVING METHOD, TERMINAL, BASE STATION AND APPARATUS

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 87 days.

(21) Appl. No.: 16/977,203

(22) PCT Filed: Feb. 27, 2019

(86) PCT No.: PCT/CN2019/076261
§ 371 (c)(1),
(2) Date: Sep. 1, 2020

(87) PCT Pub. No.: WO2019/165968
PCT Pub. Date: Sep. 6, 2019

(65) Prior Publication Data
US 2021/0014854 A1  Jan. 14, 2021

(30) Foreign Application Priority Data

Mar. 1, 2018 (CN) .......................... 201810172420.6

(51) Int. Cl.
*H04W 72/04* (2009.01)
*H04W 72/12* (2009.01)
(Continued)

(52) U.S. Cl.
CPC ...... *H04W 72/0413* (2013.01); *H04B 7/0626* (2013.01); *H04L 1/1819* (2013.01);
(Continued)

(58) Field of Classification Search
CPC ......... H04W 72/0413; H04W 72/0446; H04W 72/1284; H04L 1/1819; H04L 5/0055; H04B 7/0626
See application file for complete search history.

(56) References Cited

U.S. PATENT DOCUMENTS

2018/0007637 A1   1/2018  Yang et al.
2018/0302916 A1*  10/2018  Lee ...................... H04L 5/0012
(Continued)

FOREIGN PATENT DOCUMENTS

CN   102412880 A   4/2012
CN   107205275 A   9/2017
(Continued)

OTHER PUBLICATIONS

Extended European Search Report dated Feb. 3, 2021 for Application No. EP 19 76 1118.9.
(Continued)

*Primary Examiner* — Brian P Cox
(74) *Attorney, Agent, or Firm* — Harness, Dickey & Pierce, P.L.C.

(57) ABSTRACT

Provided are an uplink control information transmitting method and receiving method, a terminal, a base station and an apparatus. The transmitting method includes: determining a first transmission resource for first uplink control information and second transmission resources for second uplink control information; and when the first transmission resource overlaps with at least two of the second transmission resources in the time domain, transmitting the first uplink control information and at least one of the second
(Continued)

uplink control information simultaneously on the first transmission resource; wherein the at least one of the second uplink control information is the uplink control information carried on the at least two second transmission resources that overlap with the first transmission resource in the time domain.

16 Claims, 7 Drawing Sheets

(51) Int. Cl.
*H04B 7/06* (2006.01)
*H04L 1/18* (2006.01)
*H04L 5/00* (2006.01)

(52) U.S. Cl.
CPC ....... *H04L 5/0055* (2013.01); *H04W 72/0446* (2013.01); *H04W 72/1284* (2013.01)

(56) References Cited

U.S. PATENT DOCUMENTS

| | | | |
|---|---|---|---|
| 2018/0338306 A1 | 11/2018 | Wu et al. | |
| 2018/0375619 A1* | 12/2018 | Hwang | H04W 72/0446 |
| 2019/0029012 A1 | 1/2019 | Wu et al. | |

FOREIGN PATENT DOCUMENTS

| | | | | |
|---|---|---|---|---|
| CN | 107734688 A | | 2/2018 | |
| WO | WO-2017078326 A1 | * | 5/2017 | ........... H04L 1/1861 |
| WO | WO-2017/105158 A1 | | 6/2017 | |
| WO | WO-2017105158 A1 | * | 6/2017 | ........... H04L 1/1671 |
| WO | WO-2017/132810 A1 | | 8/2017 | |
| WO | WO-2017/132811 A1 | | 8/2017 | |
| WO | WO-2018/031638 A1 | | 2/2018 | |

OTHER PUBLICATIONS

International Preliminary Report on Patentability dated Sep. 10, 2020 for International Application No. PCT/CN2019/076261.
CATT, "Multiplexing of UCI transmissions of different durations or configurations", 3GPP TSG RAN WG1 Meeting AH 1801, R1-1800252, Jan. 22-26, 2018, Vancouver Canada.
Ericsson, "Summary of Discussions on Multiplexing Different UCI types on a PUCCH resource", 3GPP TSG RAN WG1 Meeting AH 1801, R1-1801262, Agenda Item 7.3.2.1, Jan. 22-26, 2018, Vancouver, Canada.
Taiwanese Office Action dated Dec. 25, 2019 for Application No. 108106674.

* cited by examiner

UPLINK CONTROL INFORMATION TRANSMITTING METHOD, UPLINK CONTROL INFORMATION RECEIVING METHOD, TERMINAL, BASE STATION AND APPARATUS

CROSS-REFERENCE TO RELATED APPLICATIONS

The present application is the U.S. national phase of PCT Application No. PCT/CN2019/076261 filed on Feb. 27, 2019, which claims priority to Chinese patent application No. 201810172420.6, filed in China on Mar. 1, 2018, the disclosure of each of which is incorporated herein by reference in their entirety.

TECHNICAL FIELD

The present disclosure relates to the field of communication techniques, in particular to an uplink control information (UCI) transmitting method, a UCI receiving method, a terminal, a base station and an apparatus.

BACKGROUND

In a New RAT (NR) system, a total of 5 NR physical uplink control channel (PUCCH) formats are defined, which include: format 0, format 1, format 2, format 3 and format 4. The PUCCH format 0 and format 1 can carry transmission of uplink control information (UCI) of 1 to 2 bits, and the PUCCH format 2, format 3 and format 4 can carry transmission of UCI of more than 2 bits. The PUCCH format 0 and format 2 are short PUCCH and occupy 1 to 2 symbols to transmit; and PUCCH format 1, format 3 and format 4 are long PUCCH, and occupy 4 to 14 symbols to transmit.

A scheduling request (SR) can be transmitted using PUCCH format 0 or format 1. The transmission period and offset for the SR are preconfigured by high-layer signaling. The transmission opportunity for the SR can be determined based on the transmission period and offset. If a positive SR is present in the SR transmission opportunity, then the SR is transmitted in a PUCCH format that is preconfigured for the SR by high-layer signaling. If a negative SR is present, then the SR is not transmitted.

A hybrid automatic repeat request-acknowledgement (HARQ-ACK) can use any one of the five formats. When the HARQ-ACK includes one or two bits, it is configured to transmit the HARQ-ACK by using the PUCCH format 0 or format 1. When the HARQ-ACK includes more than two bits, one of a plurality of PUCCH resource sets preconfigured for the terminal is selected based on the bit count. Each of the PUCCH resource sets corresponds to a range of bit counts. A PUCCH resource is selected from the selected PUCCH resource set based on the HARQ-ACK resource indication field in the downlink control information (DCI) format used by the physical downlink control channel (PDCCH) corresponding to the HARQ-ACK, and the HARQ-ACK is transmitted on the selected PUCCH resource.

Periodic channel state information (CSI) can be configured to be transmitted in the PUCCH format 2 or format 3 or format 4. The to-be-transmitted periodic CSI undergoes channel coding and rate matching, and then is mapped onto PUCCH resource other than pilots for transmission.

In summary, with the development and evolvement of mobile communication service demands, organizations such as International Telecommunication Union (ITU) and 3rd Generation Partnership Project (3GPP) have started research on new wireless communication systems (such as 5G NR (5th generation New RAT)). In the 5G NR, the HARQ-ACK can be transmitted in the NR PUCCH format 0 or format 1 or format 2 or format 3 or format 4, the SR can be transmitted in the NR PUCCH format 0 or format 1, and the periodic CSI can be transmitted in the NR PUCCH format 2 or format 3 or format 4. In the NR system, the PUCCH related parameters for different UCIs are configured independently, and the transmission resources and used PUCCH formats for different UCIs are configured independently. For example, as shown in FIG. 1, when the transmission of one type of UCI over PUCCH occupies a great quantity of symbols, multiple transmissions of another type of UCI may occur in the time domain range of the transmission of the one type of UCI. Since the terminal can transmit only one PUCCH on one uplink occasion over one carrier, no definite solution has been provided as to how to transmit the UCI in this case.

SUMMARY

It is an object of the present disclosure to provide an uplink control information transmitting method, an uplink control information receiving method, a terminal, a base station and an apparatus in order to solve the problem in the related art that there is no definite uplink control information transmitting method when transmission resources for different uplink control information overlap in the time domain.

To solve the problem mentioned above, an embodiment of the present disclosure provides a method for transmitting uplink control information, including: determining a first transmission resource for first uplink control information and second transmission resources for second uplink control information; and when the first transmission resource overlaps with the at least two second transmission resources in a time domain, transmitting the first uplink control information and at least one of the second uplink control information simultaneously on the first transmission resource; wherein the at least one of the second uplink control information is uplink control information carried on the at least two second transmission resources that overlap with the first transmission resource in the time domain.

The transmitting the first uplink control information and at least one of the second uplink control information simultaneously on the first transmission resource includes: transmitting the first uplink control information and at least two second uplink control information carried respectively on the at least two second transmission resources simultaneously on the first transmission resource.

The transmitting the first uplink control information and at least one of the second uplink control information simultaneously on the first transmission resource includes: transmitting the first uplink control information and a preset one of at least two second uplink control information carried respectively on the at least two second transmission resources simultaneously on the first transmission resource.

Prior to the transmitting the first uplink control information and at least one of the second uplink control information simultaneously on the first transmission resource, the method further includes: determining that the first uplink control information and the second uplink control information are to be transmitted simultaneously.

The first uplink control information is hybrid automatic repeat request-ACK information, channel state information or a scheduling request; the second uplink control information is hybrid automatic repeat request-ACK information, channel state information or a scheduling request.

The preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two determined as second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

An embodiment of the present disclosure further provides a method for receiving uplink control information, including: determining a first transmission resource for first uplink control information and second transmission resources for second uplink control information; and when the first transmission resource overlaps with at least two of the second transmission resources in a time domain, receiving the first uplink control information and at least one of the second uplink control information simultaneously on the first transmission resource; wherein the at least one of the second uplink control information is uplink control information carried on the at least two second transmission resources that overlap with the first transmission resource in the time domain.

The receiving the first uplink control information and at least one of the second uplink control information simultaneously on the first transmission resource includes: receiving the first uplink control information and at least two second uplink control information carried respectively on the at least two second transmission resources simultaneously on the first transmission resource.

The receiving the first uplink control information and at least one of the second uplink control information simultaneously on the first transmission resource includes: receiving the first uplink control information and a preset one of at least two second uplink control information carried respectively on the at least two second transmission resources simultaneously on the first transmission resource.

Prior to the receiving the first uplink control information and at least one of the second uplink control information simultaneously on the first transmission resource, the method further includes: determining that the first uplink control information and the second uplink control information are to be transmitted simultaneously.

The first uplink control information is hybrid automatic repeat request-ACK information, channel state information or a scheduling request; the second uplink control information is hybrid automatic repeat request-ACK information, channel state information or a scheduling request.

The preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

An embodiment of the present disclosure further provides a terminal including a transceiver, a storage, a processor and a computer program stored in the storage and configured to be executed by the processor. The processor is configured to read the computer program from the storage to perform a process of determining a first transmission resource for first uplink control information and second transmission resources for second uplink control information;

when the first transmission resource overlaps with at least two of the second transmission resources in the time domain, the transceiver is configured to transmit the first uplink control information and at least one of the second uplink control information simultaneously on the first transmission resource; wherein the at least one of the second uplink control information is uplink control information carried on the at least two second transmission resources that overlap with the first transmission resource in the time domain.

The transceiver is further configured to transmit the first uplink control information and at least two second uplink control information carried respectively on the at least two second transmission resources simultaneously on the first transmission resource.

The transceiver is further configured to transmit the first uplink control information and a preset one of at least two second uplink control information carried respectively on the at least two second transmission resources simultaneously on the first transmission resource.

The processor is further configured to determine that the first uplink control information and the second uplink control information are to be transmitted simultaneously.

The first uplink control information is hybrid automatic repeat request-ACK information, channel state information or a scheduling request; the second uplink control information is hybrid automatic repeat request-ACK information, channel state information or a scheduling request.

The preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

An embodiment of the present disclosure further provides an apparatus for transmitting uplink control information, including: a first resource determination module, configured to determine a first transmission resource for first uplink control information and second transmission resources for second uplink control information; and a transmission module, configured to, when the first transmission resource overlaps with at least two of the second transmission resources in the time domain, transmit the first uplink control information and at least one of the second uplink control information simultaneously on the first transmission resource; wherein the at least one of the second uplink control information is uplink control information carried on the at least two second transmission resources that overlap with the first transmission resource in the time domain.

An embodiment of the present disclosure further provides a computer readable storage medium storing therein a computer program, wherein the computer program is configured to be executed by a processor to implement the steps in the method for transmitting uplink control information described above.

An embodiment of the present disclosure further provides a base station including a transceiver, a storage, a processor and a computer program stored in the storage and configured to be executed by the processor. The processor is configured to read the computer program from the storage to perform the process of determining a first transmission resource for first uplink control information and second transmission resources for second uplink control information;

when the first transmission resource overlaps with at least two of the second transmission resources in a time domain, the transceiver is configured to receive the first uplink control information and at least one of the second uplink control information simultaneously on the first transmission resource; wherein the at least one of the second uplink control information is uplink control information carried on the at least two second transmission resources that overlap with the first transmission resource in the time domain.

The transceiver is further configured to receive the first uplink control information and at least two second uplink control information carried respectively on the at least two second transmission resources simultaneously on the first transmission resource.

The transceiver is further configured to receive the first uplink control information and a preset one of at least two second uplink control information carried respectively on the at least two second transmission resources simultaneously on the first transmission resource.

The processor is further configured to determine that the first uplink control information and the second uplink control information are to be transmitted simultaneously.

The first uplink control information is hybrid automatic repeat request-ACK information, channel state information or a scheduling request; the second uplink control information is hybrid automatic repeat request-ACK information, channel state information or a scheduling request.

The preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

An embodiment of the present disclosure further provides an apparatus for receiving uplink control information, including: a second resource determination module, configured to determine a first transmission resource for first uplink control information and second transmission resources for second uplink control information; and a reception module, configured to, when the first transmission resource overlaps with at least two of the second transmission resources in the time domain, receive the first uplink control information and at least one of the second uplink control information simultaneously on the first transmission resource; wherein the at least one of the second uplink control information is uplink control information carried on the at least two second transmission resources that overlap with the first transmission resource in the time domain.

An embodiment of the present disclosure further provides a computer readable storage medium storing therein a computer program, wherein the computer program is configured to be executed by a processor to implement steps in the method for receiving uplink control information described above.

The technical solution of the present disclosure as described above has at least the following beneficial effects.

In the uplink control information transmitting method, uplink control information receiving method, terminal, base station and apparatus according to embodiments of the present embodiment, when the first transmission resource overlaps with at least two second transmission resources in a time domain, the first uplink control information and at least one second uplink control information are transmitted simultaneously on the first transmission resource. As such, embodiments of the present embodiment provide a definite uplink control information transmitting method capable of ensuring normal operation of the system.

DETAILED DESCRIPTION

In order to make the technical problems to be solved, technical solutions and advantages of the present disclosure clearer, detailed description will be given below with reference to the drawings and specific embodiments.

Figure 1:
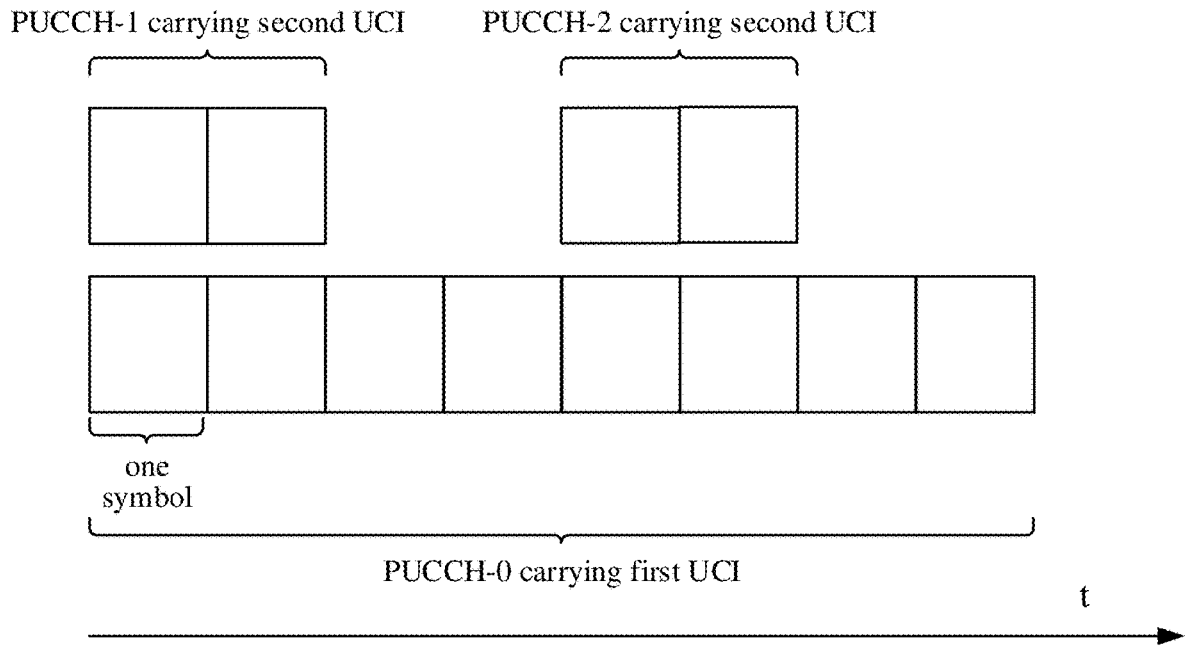
FIG. 1 illustrates a diagram showing the principle of transmitting multiple uplink control information in the related art.
Figure 2:
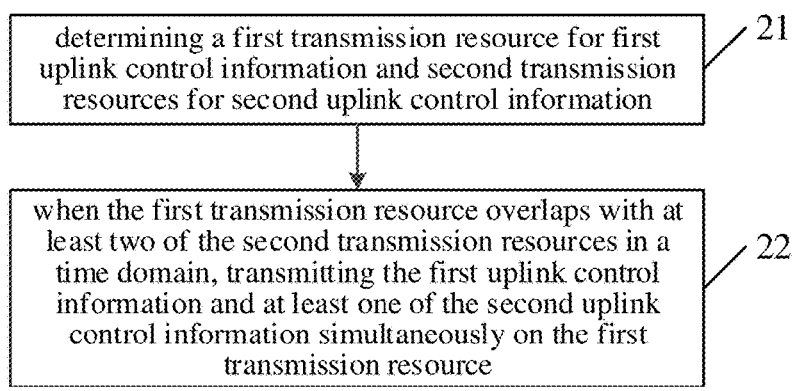
FIG. 2 illustrates a flow diagram of a method for transmitting uplink control information according to some embodiments of the present disclosure.

As shown in FIG. 2, some embodiments of the present disclosure provide a method for transmitting uplink control information. The method includes the following steps.

Step 21: determining a first transmission resource for first uplink control information and second transmission resources for second uplink control information.

In this step, the first uplink control information is hybrid automatic repeat request-ACK information (HARQ-ACK), channel state information (CSI) or a scheduling request (SR); the second uplink control information is HARQ-ACK, CSI or an SR.

Step 22: when the first transmission resource overlaps with at least two of the second transmission resources in a time domain, transmitting the first uplink control information and at least one of the second uplink control information simultaneously on the first transmission resource; wherein the at least one of the second uplink control information is uplink control information carried on the at least two second transmission resources that overlap with the first transmission resource in the time domain.

Optionally, the first transmission resource occupies a great quantity of symbols. For example, in the case that the first transmission resource is a PUCCH resource, the corresponding PUCCH is a long PUCCH, possibly occupying 4 to 14 symbols. As the first transmission resource overlaps with at least two second transmission resources in the time domain, the second transmission resources occupy fewer symbols. For example, in the case that the second transmission resource is a PUCCH resource, its corresponding PUCCH is a short PUCCH, possibly occupying 1 to 2 symbols. Of course, it cannot be ruled out that both the first transmission resource and the second transmission resource are long PUCCH transmission resources, and the first transmission resource has a time-domain length greater than that of the second transmission resource. For example, the first transmission resource occupies 14 symbols in the time domain, and one of the second transmission resources occupies 4 symbols in the time domain, etc. Of course, it cannot be ruled out that both the first transmission resource and the second transmission resource are short PUCCH transmission resources, and the first transmission resource has a time-domain length greater than that of the second transmission resource. For example, the first transmission resource occupies 2 symbols in the time domain, and one of the second transmission resources occupies 1 symbol in the time domain, etc.

It is to be noted that, the at least two second transmission resources that overlap with the first transmission resource in the time domain may be transmission resources for multiple transmissions of the same type of second uplink control information, or may be transmission resources corresponding to different types of second uplink control information respectively. For example, in the case that the second uplink control information is CSI, the second transmission resources may be different transmission opportunities determined based on different periods of the CSI configuration, or may be two CSI transmission opportunities according to the same transmission period (e.g., when a short period is configured). For another example, in the case that the second uplink control information is SR, the second transmission resources may be different transmission opportunities determined based on different periods of the SR configuration, wherein each transmission opportunity may correspond to a different SR configuration, or the second transmission resources may be multiple SR transmission opportunities according to the same SR configuration (corresponding to the same period) (e.g., when a short period is configured). For another example, in the case that the second uplink control information is HARQ-ACK, the second transmission resources may be different symbol positions determined based on the HARQ-ACK resource indication field in different DCIs.

Optionally, in the above embodiment of the present disclosure, the Step 22 includes Step 221: transmitting the first uplink control information and at least two second uplink control information carried respectively on the at least two second transmission resources simultaneously on the first transmission resource.

Alternatively, the Step 22 includes Step 222: transmitting the first uplink control information and a preset one of at least two second uplink control information carried respectively on the at least two second transmission resources simultaneously on the first transmission resource.

For example, there are two second transmission resources that overlap with the first transmission resource in the time domain, and some embodiments of the present disclosure provide two transmitting methods. The first transmitting method includes transmitting the first uplink control information and two second uplink control information simultaneously on the first transmission resource, and the two uplink control information are two uplink control information on the two second transmission resources overlapping with the first transmission resource. The second transmitting method includes transmitting the first uplink control information and a preset one of second uplink control information simultaneously on the first transmission resource. The preset one of second uplink control information is one of the two second uplink control information on the two second transmission resources overlapping with the first transmission resource.

Further, in the above embodiment of the present disclosure, prior to the Step 22, the transmitting method further includes determining that the first uplink control information and the second uplink control information are to be transmitted simultaneously. That is, prior to the Step 22, the terminal needs to determine whether the first uplink control information and second uplink control information are to be transmitted simultaneously. If the first uplink control information and second uplink control information are to be transmitted simultaneously, then the process proceeds to Step 22; otherwise, only the first uplink control information is transmitted or only the second uplink control information is transmitted.

Optionally, in the above embodiment of the present disclosure, the preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources, that is, based on the processing time, the second uplink control information that can be ready for transmission before transmission occurs on the first transmission resource is determined, and the corresponding second uplink control information is the second uplink control information satisfying the processing latency. For example, the second uplink control information that can be acquired before the first uplink control information is coded or mapped is the second uplink control information satisfying the processing latency.

It is to be noted that the second uplink control information satisfying the processing latency may include one or more second uplink control information. If there are multiple second uplink control information satisfying the processing latency, then one second uplink control information may further be selected among the multiple second uplink control information depending on other criteria. The other criteria include: the priority of the second uplink control information, the sequence of the second uplink control information, or the like, and no specific limitation is imposed here in this respect. Of course, it is also possible not to incorporate other priorities. Rather, the multiple second uplink control information satisfying the processing latency and the first uplink control information are transmitted simultaneously.

In summary, in the method for transmitting uplink control information according to the above embodiments of the present disclosure, when the first transmission resource overlaps with the at least two second transmission resources in the time domain, the first uplink control information and at least one second uplink control information are transmitted simultaneously on the first transmission resource. Some embodiments of the present disclosure provide a definite method for transmitting uplink control information, thereby ensuring normal operation of the system.

Figure 3:
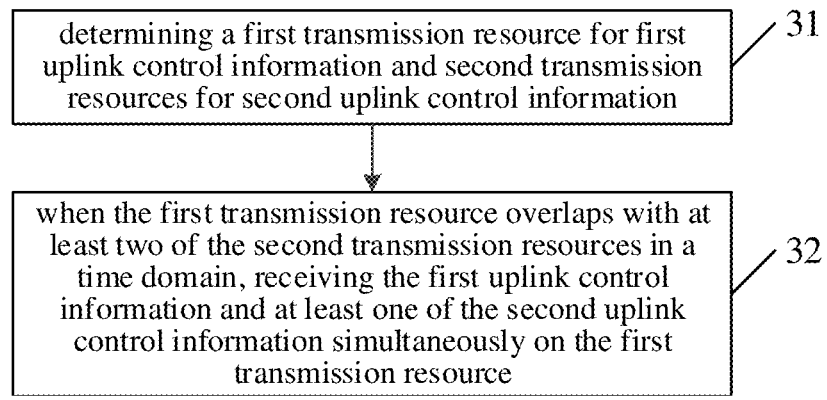
FIG. 3 illustrates a flow diagram of a method for receiving uplink control information according to some embodiments of the present disclosure.

As shown in FIG. 3, some embodiments of the present disclosure further provide a method for receiving uplink control information. The method includes the following steps.

Step 31: determining a first transmission resource for first uplink control information and second transmission resources for second uplink control information.

In this step, the first uplink control information is HARQ-ACK, CSI or an SR; the second uplink control information is HARQ-ACK, CSI or an SR.

Step 32: when the first transmission resource overlaps with at least two of the second transmission resources in a time domain, receiving the first uplink control information and at least one of the second uplink control information simultaneously on the first transmission resource; wherein the at least one of the second uplink control information is uplink control information carried on the at least two second transmission resources that overlap with the first transmission resource in the time domain.

Optionally, the first transmission resource occupies a great quantity of symbols. For example, in the case that the first transmission resource is a PUCCH resource, the corresponding PUCCH is a long PUCCH, possibly occupying 4 to 14 symbols. As the first transmission resource overlaps with at least two second transmission resources in the time domain, the second transmission resources occupy fewer symbols. For example, in the case that the second transmission resource is a PUCCH resource, its corresponding PUCCH is a short PUCCH, possibly occupying 1 to 2 symbols. Of course, it cannot be ruled out that both the first transmission resource and the second transmission resource are long PUCCH transmission resources, and the first transmission resource has a time-domain length greater than that of the second transmission resource. For example, the first transmission resource occupies 14 symbols in the time domain, and one of the second transmission resources occupies 4 symbols in the time domain, etc. Of course, it cannot be ruled out that both the first transmission resource and the second transmission resource are short PUCCH transmission resources, and the first transmission resource has a time-domain length greater than that of the second transmission resource. For example, the first transmission resource occupies 2 symbols in the time domain, and one of the second transmission resources occupies 1 symbol in the time domain, etc.

It is to be noted that, the at least two second transmission resources that overlap with the first transmission resource in the time domain may be transmission resources for multiple transmissions of the same type of second uplink control information, or may be transmission resources corresponding to different types of second uplink control information respectively. For example, in the case that the second uplink control information is CSI, the second transmission resources may be different transmission opportunities determined based on different periods of the CSI configuration, or may be two CSI transmission opportunities according to the same transmission period (e.g., when a short period is configured). For another example, in the case that the second uplink control information is SR, the second transmission resources may be different transmission opportunities determined based on different periods of the SR configuration, wherein each transmission opportunity may correspond to a different SR configuration, or the second transmission resources may be multiple SR transmission opportunities according to the same SR configuration (corresponding to the same period) (e.g., when a short period is configured). For another example, in the case that the second uplink control information is HARQ-ACK, the second transmission resources may be different symbol positions determined based on the HARQ-ACK resource indication field in different DCIs.

Optionally, in some embodiments of the present disclosure, the Step 32 includes Step 321: receiving the first uplink control information and at least two second uplink control information carried respectively on the at least two second transmission resources simultaneously on the first transmission resource.

Alternatively, the Step 32 includes step 322: receiving the first uplink control information and a preset one of at least two second uplink control information carried respectively on the at least two second transmission resources simultaneously on the first transmission resource.

For example, there are two second transmission resources that overlap with the first transmission resource in the time domain, and some embodiments of the present disclosure provide two receiving methods. The first receiving method includes receiving the first uplink control information and two second uplink control information simultaneously on the first transmission resource, and the two uplink control information are two uplink control information on two second transmission resources overlapping with the first transmission resource. The second receiving method includes receiving the first uplink control information and a preset one of second uplink control information simultaneously on the first transmission resource. The preset one of second uplink control information is one of the two second uplink control information on the two second transmission resources overlapping with the first transmission resource.

Further, in the above embodiment of the present disclosure, prior to Step 32, the method further includes determining that the first uplink control information and the second uplink control information are to be transmitted simultaneously. That is, prior to Step 32, the base station needs to determine whether the first uplink control information and second uplink control information are to be transmitted simultaneously. If the first uplink control information and second uplink control information are to be transmitted simultaneously, then the process proceeds to Step 32; otherwise, only the first uplink control information is received or only the second uplink control information is received.

Optionally, in the above embodiment of the present disclosure, the preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources, that is, based on the processing time, the second uplink control information that can be ready for transmission before transmission occurs on the first transmission resource is determined, and the corresponding second uplink control information is the second uplink control information satisfying the processing latency. For example, the second uplink control information that can be acquired before the first uplink control information is coded or mapped is the second uplink control information satisfying the processing latency.

It is to be noted that the second uplink control information satisfying the processing latency may include one or more second uplink control information. If there are multiple second uplink control information satisfying the processing latency, then one second uplink control information may further be selected among the multiple second uplink control information depending on other criteria. The other criteria include the priority of the second uplink control information, the sequence of the second uplink control information, or the like, and no specific limitation is imposed here in this respect. Of course, it is also possible not to incorporate other priorities. Rather, the multiple second uplink control information satisfying the processing latency and the first uplink control information are transmitted simultaneously.

In summary, in the method for receiving uplink control information according to the above embodiments of the present disclosure, when the first transmission resource overlaps with the at least two second transmission resources in the time domain, the first uplink control information and the at least one second uplink control information are received simultaneously on the first transmission resource. Some embodiments of the present disclosure provide a definite method for receiving uplink control information, thereby ensuring normal operation of the system.

In order to describe the uplink control information transmitting method and receiving method according to some embodiments of the present disclosure in further details, detailed description of some embodiments of the present disclosure will be given below with reference to drawings and examples.

FIRST EXAMPLE

Figure 4:
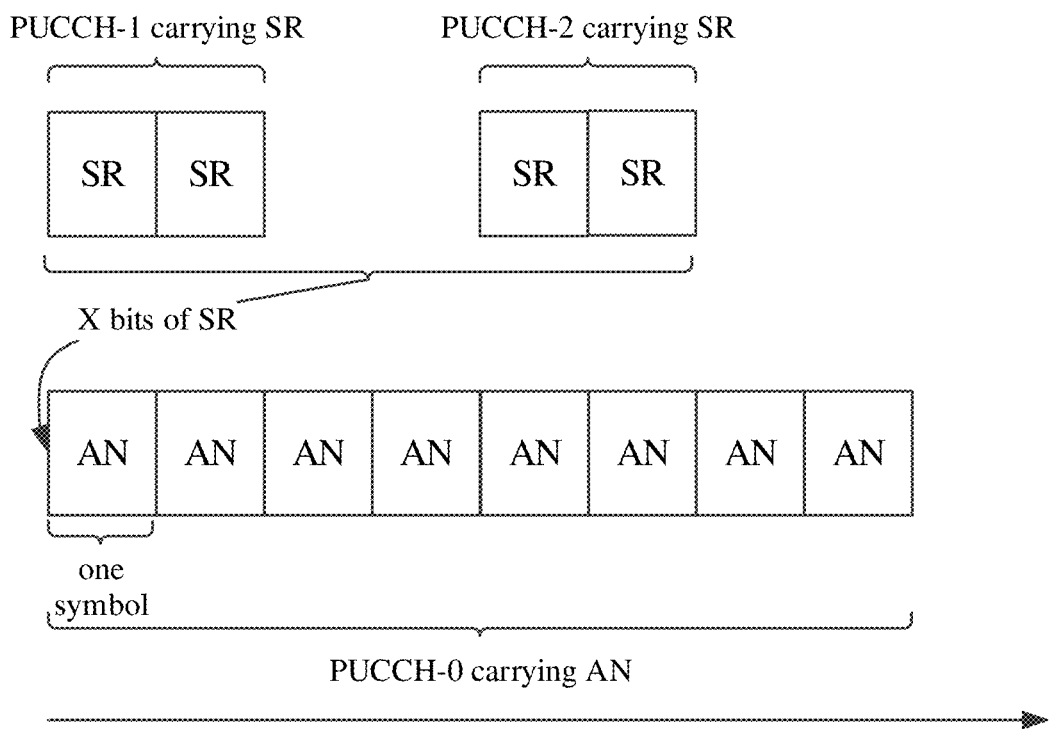
FIG. 4 illustrates a first diagram showing the principle of transmitting and receiving uplink control information in a first example according to some embodiments of the present disclosure.
Figure 5:
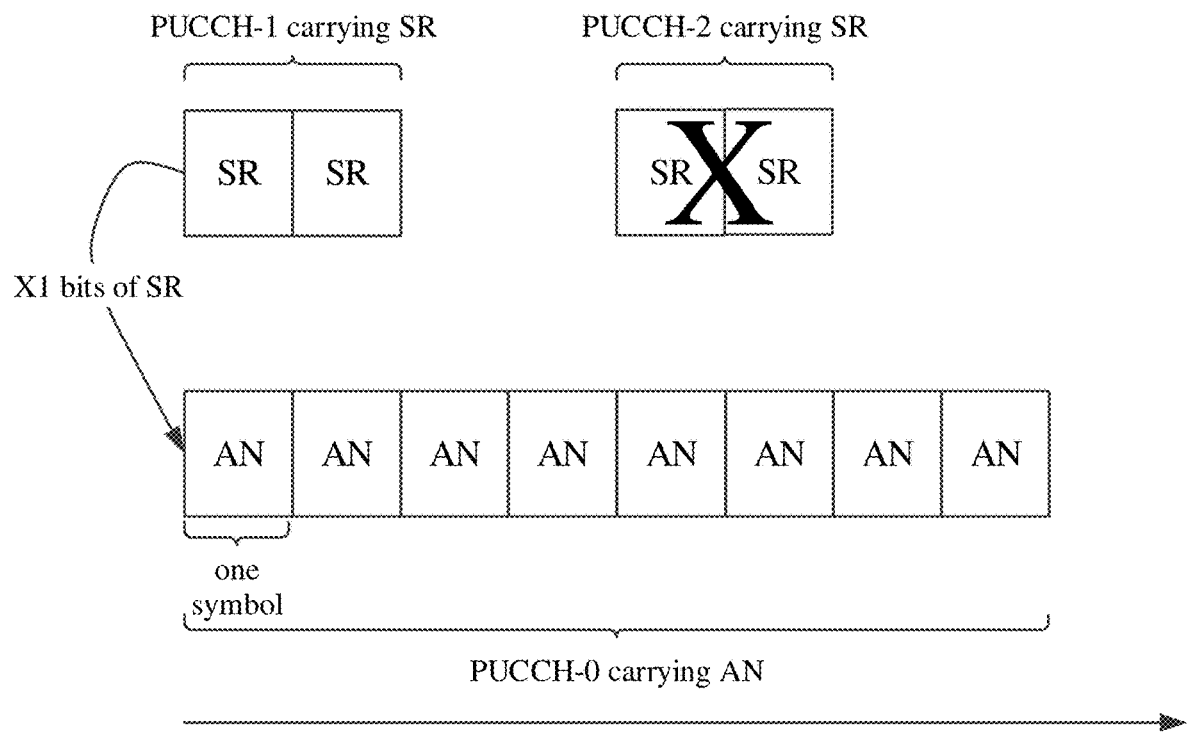
FIG. 5 illustrates a second diagram showing the principle of transmitting and receiving uplink control information in a first example according to some embodiments of the present disclosure.

As shown in FIG. 4 and FIG. 5, the first UCI is HARQ-ACK, and the second UCI is SR. The HARQ-ACK (abbreviated as AN in FIG. 4) is transmitted in the PUCCH format 3 or format 4, i.e., the transmission resource for HARQ-ACK is PUCCH format 3 or format 4 resource, and assume that each PUCCH format 3 or format 4 resource occupies 8 symbols for transmission. SR is transmitted in PUCCH format 0, i.e., the transmission resource for SR is PUCCH format 0 resource, and assume that each PUCCH format 0 resource occupies 2 symbols for transmission.

Assuming that two transmission resources for SR (PUCCH-1 and PUCCH-2 as shown in FIG. 4 and FIG. 5) overlap with the transmission resource for HARQ-ACK (PUCCH-0 as shown in FIG. 4 and FIG. 5) in the time domain, it is determined at this time to transmit HARQ-ACK and SR simultaneously using the transmission resource for HARQ-ACK (i.e., the first transmission resource). For example, X bits of SR and HARQ-ACK are transmitted simultaneously on the transmission resource for HARQ-ACK by means of joint coding, where X is $\lceil \log_2 (K+1) \rceil$, K is the quantity of configurations of SR overlapping with the HARQ-ACK in the time domain, or K is the quantity of SR configurations configured for the terminal. That is, regardless of whether the SR is positive SR or negative SR, X bits of SR need to be transmitted.

In a first implementation, as shown in FIG. 4, HARQ-ACK and all the SRs overlapping with the HARQ-ACK are transmitted simultaneously on the transmission resource for HARQ-ACK. Assuming that two SRs overlapping with HARQ-ACK are SR transmission opportunities according to two SR configurations respectively, the terminal transmits the SRs and HARQ-ACK simultaneously on the PUCCH format 3 or format 4 resource for HARQ-ACK (PUCCH-0) by means of, for example, joint coding of X bits of SR and HARQ-ACK, where X is determined based on the quantity of SR configurations configured for the terminal. That is, the X bits of SR include SRs in two SR configurations. As another example, based on the sequence of SR configuration numbers, each bit of the X bits corresponds to an SR configuration, and a bit being 1 or 0 denotes that an SR in this SR configuration is positive or negative. If it is unknown whether the SR on a certain SR transmission resource is a positive SR when the HARQ-ACK is undergoing a preparatory processing (e.g., channel coding), then the SR is assumed to be a negative SR. It is to be noted that, in this case, the terminal does not need to transmit PUCCH on the resource for SR.

Similar to the terminal, the base station side receives X bits of SR and corresponding HARQ-ACK simultaneously on the PUCCH format 3 or format 4 resource for HARQ-ACK (PUCCH-0), and then may acquire simultaneously the SR feedback states for multiple SR configurations based on the correspondence between various SR configurations and the X bits of SR.

In a second implementation, as shown in FIG. 5, HARQ-ACK and some of the SRs overlapping with the HARQ-ACK are transmitted simultaneously on the transmission resource for HARQ-ACK. For example, the SR on the first SR transmission resource or the SR having the highest priority among multiple SRs is always selected (for example, it is assumed that the first SR is selected based on the service types, feedback periods or the like corresponding to different SR configurations). The terminal transmits the SR on the first SR transmission resource and HARQ-ACK simultaneously on the PUCCH format 3 or format 4 resource for HARQ-ACK (PUCCH-0) by means of, for example, joint coding of the X1 bits of SR and HARQ-ACK, where X1 is determined based on the quantity of SR configurations, configured for the terminal, of SRs overlapping the HARQ-ACK in the SR transmission opportunities of PUCCH-1. If it is unknown whether the SR on a certain SR transmission resource is a positive SR when HARQ-ACK is undergoing a preparatory processing (e.g., channel coding), then the SR is assumed to be a negative SR. It is to be noted that, in this case, the terminal does not need to transmit PUCCH on the resource for SR.

Similar to the terminal, the base station side receives X1 bits of SR and corresponding HARQ-ACK simultaneously on the PUCCH format 3 or format 4 resource for HARQ-ACK (PUCCH-0), and then may determine the X1 bits of SR as the states of SRs in the SR transmission opportunities of PUCCH-1 according to a predetermined rule.

It is to be noted that, the method also applies if the first uplink control information in the first example is replaced with CSI in another implementation. However, it needs to be determined whether simultaneous transmission of CSI and SR is supported based on the configuration of the high-layer signaling. If the simultaneous transmission of CSI and SR is supported, the process proceeds as described in the first example, otherwise, only one of them is transmitted, for example, SR is selected and CSI is discarded. The method also applies if, on the basis that the first uplink control information in the first example is replaced with CSI, one SR in the first example is further replaced with HARQ-ACK, and HARQ-ACK is configured to be transmitted in PUCCH format 2 occupying two symbols. In this case, if the method in which a preset second uplink control information is selected to be transmitted simultaneously with the first uplink control information is adopted, a type of uplink control information may be selected based on the priorities of the types of uplink control information. For example, if HARQ-ACK has a priority higher than that of SR, HARQ-ACK is selected and SR is discarded.

It is to be noted that, the method also applies if one SR in the example described above is replaced with CSI and CSI is configured to be transmitted in PUCCH format 2 occupying two symbols in another implementation. In this case, if the method in which a preset second uplink control information is selected to be transmitted simultaneously with the first uplink control information is adopted, a type of uplink control information may be selected based on the priorities of the types of uplink control information. For example, if SR has a priority higher than that of CSI, SR is selected and CSI is discarded.

SECOND EXAMPLE

Figure 6:
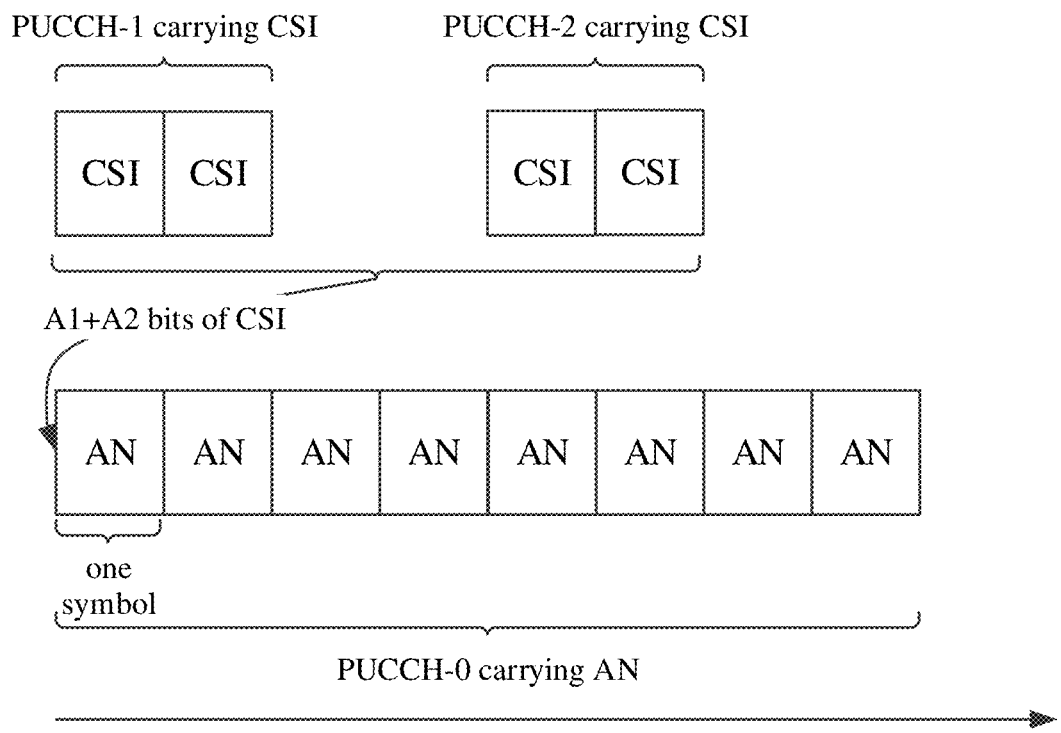
FIG. 6 illustrates a first diagram showing the principle of transmitting and receiving uplink control information in a second example according to some embodiments of the present disclosure.
Figure 7:
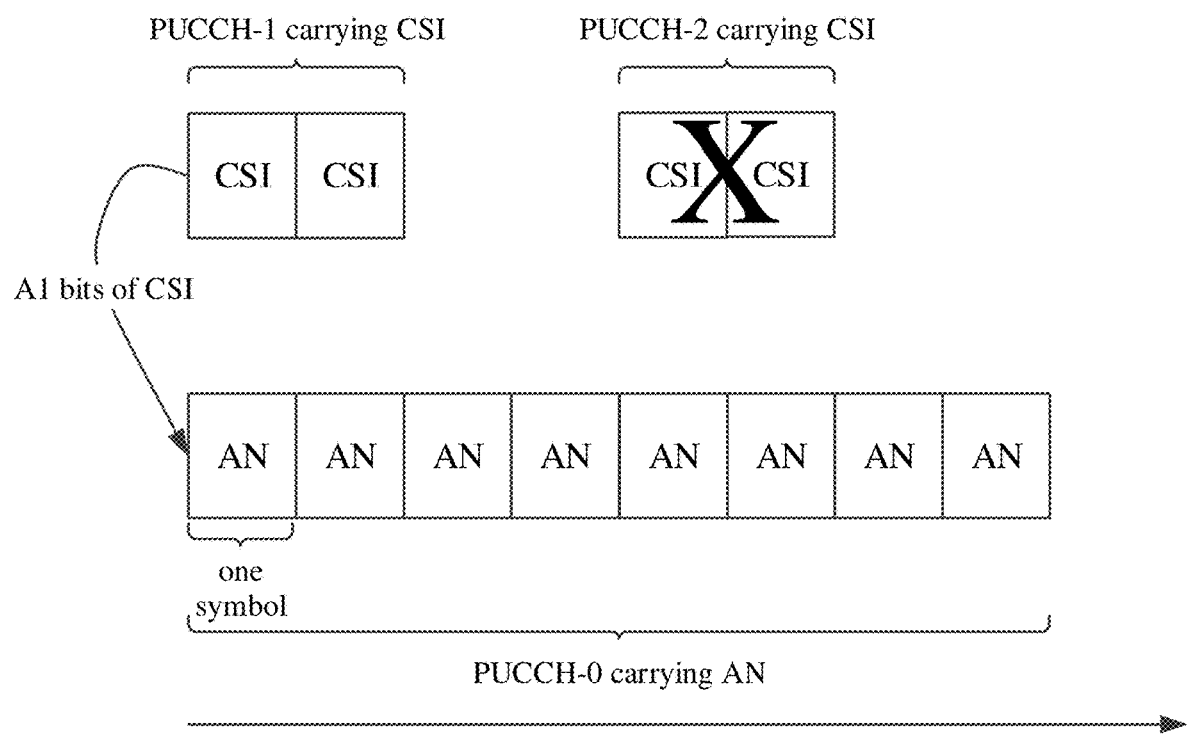
FIG. 7 illustrates a second diagram showing the principle of transmitting and receiving uplink control information in a second example according to some embodiments of the present disclosure.

As shown in FIG. 6 and FIG. 7, the first UCI is HARQ-ACK, and the second UCI is CSI. HARQ-ACK (abbreviated as AN in FIG. 4) is transmitted in PUCCH format 3 or format 4, i.e., the transmission resource for HARQ-ACK is PUCCH format 3 or format 4 resource, and assume that each PUCCH format 3 or format 4 resource occupies 8 symbols for transmission. CSI is transmitted in PUCCH format 2, i.e., the transmission resource for CSI is PUCCH format 2 resource, and assume that each PUCCH format 2 resource occupies 2 symbols for transmission.

Assuming that two transmission resources for CSI (PUCCH-1 and PUCCH-2 as shown in FIG. 6 and FIG. 7) overlap with the transmission resource for HARQ-ACK (PUCCH-0 as shown in FIG. 6 and FIG. 7) in the time domain and it is determined based on a configuration of high-layer signaling that simultaneous transmission of CSI and HARQ-ACK is supported, it is determined at this time that HARQ-ACK and CSI are to be transmitted simultaneously using the HARQ-ACK transmission resource (i.e., the first transmission resource). For example, CSI and HARQ-ACK are transmitted simultaneously on the resource for HARQ-ACK by means of joint coding or independent coding.

In a first implementation, as shown in FIG. 6, HARQ-ACK and all the CSIs overlapping with the HARQ-ACK are transmitted simultaneously on the transmission resource for HARQ-ACK. The terminal transmits two CSIs (A1+A2 bits of CSI) and HARQ-ACK simultaneously on the PUCCH format 3 or format 4 resource for HARQ-ACK (PUCCH-0). If the CSI on the transmission resource for a certain CSI is unknown when the HARQ-ACK is undergoing a preparatory processing (e.g., channel coding), then the CSI is assumed to be placeholder information, such as a preset value (all 0s or all 1 s, etc.). Then the terminal does not need to transmit PUCCH on the transmission resource for CSI. A1 and A2 may be the same or different. When A1=A2, the A1 bits of CSI and the A2 bits of CSI may have the same or different specific contents.

Similar to the terminal, the base station receives two CSIs and a corresponding HARQ-ACK simultaneously on the PUCCH format 3 or format 4 resource for HARQ-ACK (PUCCH-0), and then may obtain 2 CSI feedbacks simultaneously, where different CSIs may correspond to different service types or may be of different configuration types.

In a second implementation, as shown in FIG. 7, HARQ-ACK and some of the CSIs overlapping with the HARQ-ACK are transmitted simultaneously on the transmission resource for HARQ-ACK. For example, the CSI on the first CSI transmission resource or the CSI having the highest priority among multiple CSIs is always selected (for example, it is assumed that the first CSI is selected based on the configuration type of CSI, the corresponding service, etc.), or the CSI whose specific information can be acquired when HARQ-ACK is being prepared for transmission (such as channel coding) is selected from multiple CSIs (since it is necessary to acquire precise CSI information prior to coding when CSI and HARQ-ACK need to undergo channel coding simultaneously, but, assuming that the first CSI is selected, the CSI measurement resource and the time required for CSI measurement may not allow the acquisition of actual CSI at the moment when HARQ-ACK undergoes channel coding). The terminal transmits the selected CSI (A1 bits of CSI) and HARQ-ACK simultaneously on the PUCCH format 3 or format 4 resource for HARQ-ACK (PUCCH-0), and the terminal does not need to transmit PUCCH on the transmission resource for CSI.

Similar to the terminal, the base station receives the selected CSI and corresponding HARQ-ACK simultaneously on the PUCCH format 3 or format 4 resource for HARQ-ACK (PUCCH-0), and may determine, according to the same rule as that on the terminal side, which CSI transmission resource corresponds to the transmitted CSI.

It is to be noted that, the method also applies if the HARQ-ACK and CSI swap positions in the second example. That is, assuming that the first UCI is CSI and the second UCI is HARQ-ACK and that HARQ-ACK can be configured to be transmitted in the PUCCH format 0, the method described above also applies. Further, when one HARQ-ACK is replaced with SR on the assumption that the first UCI is CSI and the second UCI is HARQ-ACK, the method also applies. In this case, if the method in which a second uplink control information is selected to be transmitted simultaneously with the first uplink control information is adopted, a type of UCI may be selected based on the priorities of the types of uplink control information. For example, if HARQ-ACK has a priority higher than that of SR, then HARQ-ACK is selected and SR is discarded.

THIRD EXAMPLE

Figure 8:
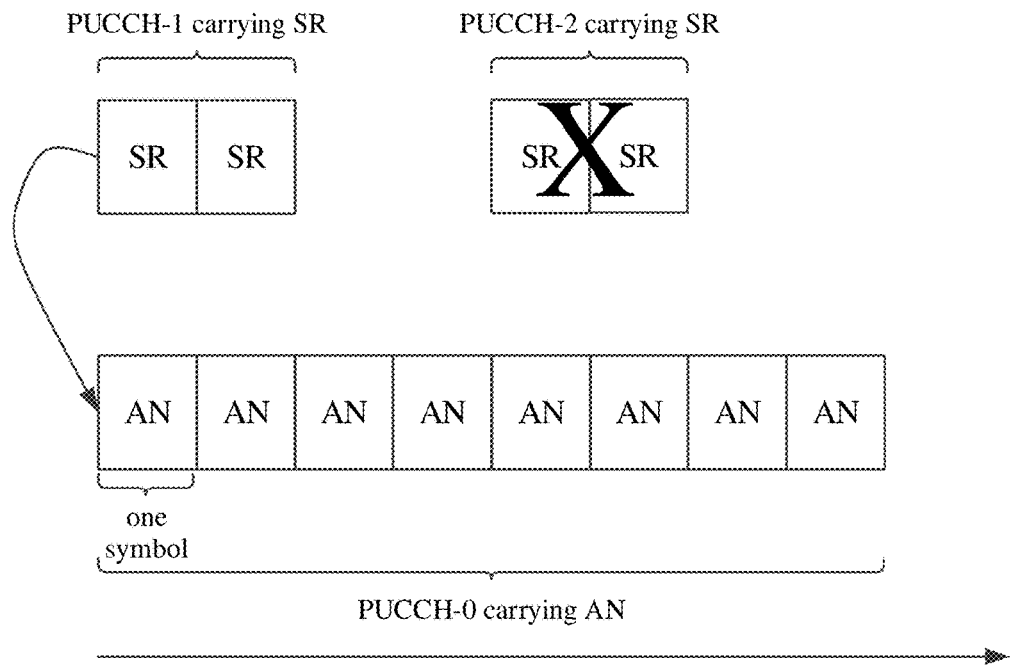
FIG. 8 illustrates a diagram showing the principle of transmitting and receiving uplink control information in a third example according to some embodiments of the present disclosure.

As shown in FIG. 8, the first uplink control information is HARQ-ACK and the second uplink control information is SR. HARQ-ACK (abbreviated as AN in FIG. 8) is transmitted in PUCCH format 1, i.e., the transmission resource for HARQ-ACK is PUCCH format 1 resource, and assume that each PUCCH format 1 resource occupies eight symbols for transmission. SR is transmitted in PUCCH format 0, i.e., the transmission resource for SR is PUCCH format 0 resource, and assume that one PUCCH format 0 resource occupies two symbols for transmission.

Assuming that two transmission resources for SR (PUCCH-1 and PUCCH-2 as shown in FIG. 8) overlap with the transmission resource for HARQ-ACK (PUCCH-0 as shown in FIG. 8) in the time domain, it is determined that HARQ-ACK and SR are to be transmitted simultaneously using the transmission resource for HARQ-ACK (i.e., first transmission resource). For example, the fact that there is simultaneous transmission of a certain SR is expressed implicitly by transmitting HARQ-ACK with cyclic shift corresponding to the selected SR.

Then, as shown in FIG. 8, HARQ-ACK and some of the SRs overlapping with the HARQ-ACK are transmitted simultaneously on the transmission resource for HARQ-ACK. For example, the SR on the first SR transmission resource or the SR having the highest priority among multiple SRs is always selected (e.g., it is assumed that the first SR is selected based on the service types, feedback periods or the like corresponding to different SR configurations).

The terminal transmits SR and HARQ-ACK simultaneously on the PUCCH format 1 resource for HARQ-ACK (PUCCH-0), and expresses implicitly the fact that there is simultaneous transmission of a certain SR by transmitting HARQ-ACK with cyclic shift corresponding to the selected SR. If it is unknown whether the SR on the transmission resource for a certain SR is a positive SR when HARQ-ACK is undergoing a preparatory processing (e.g., channel coding), then the SR is assumed to be a negative SR. In this case, the terminal does not need to transmit PUCCH on the resource for SR.

Similar to the terminal, the base station receives HARQ-ACK on the PUCCH format 1 resource for HARQ-ACK (PUCCH-0), and determines, based on the cyclic shifted resource used by the received HARQ-ACK, which SR is transmitted simultaneously and whether this SR is positive.

Of course, in this case, HARQ-ACK and multiple SRs overlapping with the HARQ-ACK can also be transmitted simultaneously on the resource for HARQ-ACK. In an approach, a correspondence between the combination state of multiple SRs and a corresponding cyclic shift is predefined. The terminal transmits HARQ-ACK by using the cyclic shift corresponding to the combination state of multiple SRs, thereby expressing implicitly the states of multiple SRs. For example, if the first SR is 1 (e.g., representing a positive SR) and the second SR is 0 (e.g., representing a negative SR), HARQ-ACK is transmitted on the transmission resource for HARQ-ACK by using the cyclic shift corresponding to the combination state 10 that is agreed or configured in advance. The base station may use the same manner of mapping to determine the specific state of each SR of multiple SRs transmitted by the terminal. In another approach, the feedback states of multiple SRs are subjected to a logical operation, such as logical AND or logical OR, and a resultant SR is transmitted simultaneously with HARQ-ACK on the resource for HARQ-ACK in a specific transmission manner as described above in the third example.

It is to be noted that, the method also applies if HARQ-ACK and SR swap positions in the third example. That is, the method described above applies assuming that the first UCI is SR and the second UCI is HARQ-ACK. In another word, one HARQ-ACK can be selected to be transmitted simultaneously with SR on the resource for SR, or multiple HARQ-ACKs and SR may be transmitted simultaneously on the resource for SR, or multiple HARQ-ACKs may be subjected to a logical operation and the result of the logical operation may be transmitted simultaneously with SR on the resource for SR. The state of SR is expressed implicitly by transmitting HARQ-ACK on the resource for SR with cyclic shifts corresponding to different SR states.

In summary, in the above embodiments of the present disclosure, when the first transmission resource and the at least two second transmission resources overlap in the time domain, the first uplink control information and the at least one second uplink control information are transmitted simultaneously on the first transmission resource. Some embodiments of the present disclosure provide a definite method for transmitting and receiving uplink control information, thereby ensuring normal operation of the system.

Figure 9:
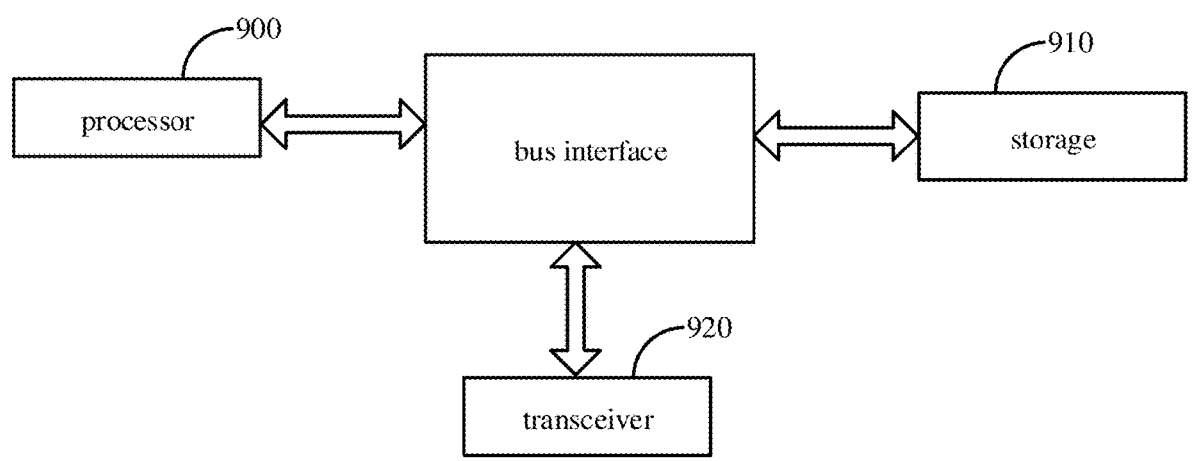
FIG. 9 illustrates a schematic structural view of a terminal and a base station according to some embodiments of the present disclosure.

As shown in FIG. 9, some embodiments of the present disclosure further provide a terminal including a transceiver 920, a storage 910, a processor 900 and a computer program stored in the storage 910 and configured to be executed by the processor 900. The processor 900 is configured to read the computer program from the storage 910 to perform the process of determining a first transmission resource for first uplink control information and second transmission resources for second uplink control information; when the first transmission resource overlaps with at least two of the second transmission resources in the time domain, the transceiver 920 is configured to transmit the first uplink control information and at least one of the second uplink control information simultaneously on the first transmission resource; wherein the at least one of the second uplink control information is the uplink control information carried on the at least two second transmission resources that overlap with the first transmission resource in the time domain.

Optionally, in the above embodiments of the present disclosure, the transceiver 920 is further configured to transmit the first uplink control information and at least two second uplink control information carried respectively on the at least two second transmission resources simultaneously on the first transmission resource.

Optionally, in the above embodiments of the present disclosure, the transceiver 920 is further configured to transmit the first uplink control information and a preset one of at least two second uplink control information carried respectively on the at least two second transmission resources simultaneously on the first transmission resource.

Optionally, in the above embodiments of the present disclosure, the processor 900 is further configured to determine that the first uplink control information and the second uplink control information are to be transmitted simultaneously.

Optionally, in the above embodiments of the present disclosure, the first uplink control information is hybrid automatic repeat request-ACK information, channel state information or a scheduling request; the second uplink control information is hybrid automatic repeat request-ACK information, channel state information or a scheduling request.

Optionally, in the above embodiments of the present disclosure, the preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

In summary, in the above embodiments of the present disclosure, when the first transmission resource and the at least two second transmission resources overlap in the time domain, the first uplink control information and at least one of the second uplink control information are transmitted simultaneously on the first transmission resource. Some embodiments of the present disclosure provide a definite method for transmitting uplink control information, thereby ensuring normal operation of the system.

It is to be noted that, the terminal according to some embodiments of the present disclosure is a terminal capable of performing the uplink control information transmitting method described above, and all the embodiments of the uplink control information transmitting method described above apply to this terminal and may achieve the same or similar beneficial effects.

Figure 10:
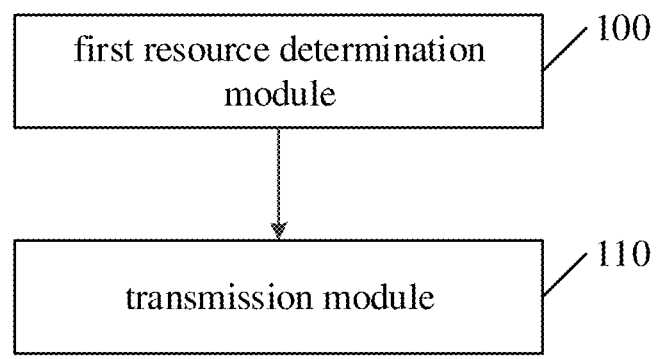
FIG. 10 illustrates a schematic structural view of an apparatus for transmitting uplink control information according to some embodiments of the present disclosure.

As shown in FIG. 10, some embodiments of the present disclosure further provide an apparatus for transmitting uplink control information, including: a first resource determination module 100, configured to determine a first transmission resource for first uplink control information and second transmission resources for second uplink control information; and a transmission module 110, configured to, when the first transmission resource overlaps with at least two of the second transmission resources in the time domain, transmit the first uplink control information and at least one of the second uplink control information simultaneously on the first transmission resource; wherein the at least one of the second uplink control information is uplink control information carried on the at least two second transmission resources that overlap with the first transmission resource in the time domain.

Optionally, in the above embodiments of the present disclosure, the transmission module includes: a first transmission submodule, configured to transmit the first uplink control information and at least two second uplink control information carried respectively on the at least two second transmission resources simultaneously on the first transmission resource.

Optionally, in the above embodiments of the present disclosure, the transmission module includes: a second transmission submodule, configured to transmit the first uplink control information and a preset one of at least two second uplink control information carried respectively on the at least two second transmission resources simultaneously on the first transmission resource.

Optionally, in the above embodiments of the present disclosure, the apparatus further includes: a second determination module, configured to determine that the first uplink control information and the second uplink control information are to be transmitted simultaneously.

Optionally, in the above embodiments of the present disclosure, the first uplink control information is hybrid automatic repeat request-ACK information, channel state information or a scheduling request; the second uplink control information is hybrid automatic repeat request-ACK information, channel state information or a scheduling request.

Optionally, in the above embodiments of the present disclosure, the preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

In summary, in the above embodiments of the present disclosure, when the first transmission resource and the at least two second transmission resources overlap in the time domain, the first uplink control information and the at least one of the second uplink control information are transmitted simultaneously on the first transmission resource. Some embodiments of the present disclosure provide a definite method for transmitting uplink control information, thereby ensuring normal operation of the system.

It is to be noted that, the apparatus for transmitting uplink control information according to some embodiments of the present disclosure is an uplink control information transmitting apparatus capable of performing the method for transmitting uplink control information described above, and all the embodiments of the uplink control information transmitting method described above apply to this transmitting apparatus and may achieve the same or similar beneficial effects.

Some embodiments of the present disclosure further provide a computer readable storage medium storing therein a computer program, wherein the computer program is configured to be executed by a processor to implement various processes of the embodiments of the method for transmitting uplink control information described above, and may achieve the same technical effects. No detailed description is given here to avoid repetition. The computer readable storage medium is, for example, a read-only memory (ROM), a random access memory (RAM), a magnetic disk, an optic disc, or the like.

As shown in FIG. 9, some embodiments of the present disclosure further provides a base station, including a transceiver 920, a storage 910, a processor 900 and a computer program stored in the storage 910 and configured to be executed by the processor 900. The processor 900 is configured to read the computer program from the storage 910 to perform the process of determining a first transmission resource for first uplink control information and second transmission resources for second uplink control information; when the first transmission resource overlaps with at least two of the second transmission resources in the time domain, the transceiver 920 is configured to receive the first uplink control information and at least one of the second uplink control information simultaneously on the first transmission resource; wherein the at least one of the second uplink control information is uplink control information carried on the at least two second transmission resources that overlap with the first transmission resource in the time domain.

Optionally, in the above embodiments of the present disclosure, the transceiver 920 is further configured to receive the first uplink control information and at least two second uplink control information carried respectively on the at least two second transmission resources simultaneously on the first transmission resource.

Optionally, in the above embodiments of the present disclosure, the transceiver 920 is further configured to receive the first uplink control information and a preset one of at least two second uplink control information carried respectively on the at least two second transmission resources simultaneously on the first transmission resource.

Optionally, in the above embodiments of the present disclosure, the transceiver 900 is further configured to determine that the first uplink control information and the second uplink control information are to be transmitted simultaneously.

Optionally, in the above embodiments of the present disclosure, the first uplink control information is hybrid automatic repeat request-ACK information, channel state information or a scheduling request; the second uplink control information is hybrid automatic repeat request-ACK information, channel state information or a scheduling request.

Optionally, in the above embodiments of the present disclosure, the preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

In summary, in the above embodiments of the present disclosure, when the first transmission resource and the at least two second transmission resources overlap in the time domain, the first uplink control information and the at least one second uplink control information are received simultaneously on the first transmission resource. Some embodiments of the present disclosure provide a definite method for receiving uplink control information, thereby ensuring normal operation of the system.

It is to be noted that the base station according to some embodiments of the present disclosure is a base station capable of performing the method for receiving uplink control information described above, and all the embodiments of the uplink control information receiving method described above apply to this base station and may achieve the same or similar beneficial effects.

Figure 11:
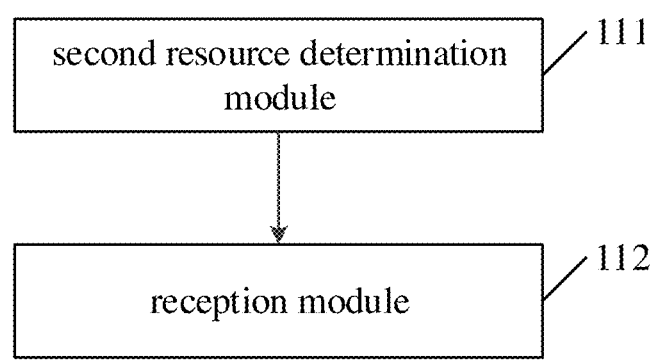
FIG. 11 illustrates a schematic structural view of an apparatus for receiving uplink control information according to some embodiments of the present disclosure.

As shown in FIG. 11, some embodiments of the present embodiment further provide an apparatus for receiving uplink control information, including: a second resource determination module 111, configured to determine a first transmission resource for first uplink control information and second transmission resources for second uplink control information; and a reception module 112, configured to, when the first transmission resource overlaps with at least two of the second transmission resources in the time domain, receive the first uplink control information and at least one of the second uplink control information simultaneously on the first transmission resource; wherein the at least one of the second uplink control information is uplink control information carried on the at least two second transmission resources that overlap with the first transmission resource in the time domain.

Optionally, in the above embodiments of the present disclosure, the reception module includes: a first reception submodule, configured to receive the first uplink control information and at least two second uplink control information carried respectively on the at least two second transmission resources simultaneously on the first transmission resource.

Optionally, in the above embodiments of the present disclosure, the reception module includes: a second reception submodule, configured to receive the first uplink control information and a preset one of at least two second uplink control information carried respectively on the at least two second transmission resources simultaneously on the first transmission resource.

Optionally, in the above embodiments of the present disclosure, the apparatus further includes: a first determination module, configured to determine that the first uplink control information and the second uplink control information are to be transmitted simultaneously.

Optionally, in the above embodiments of the present disclosure, the first uplink control information is hybrid automatic repeat request-ACK information, channel state information or a scheduling request; the second uplink control information is hybrid automatic repeat request-ACK information, channel state information or a scheduling request.

Optionally, in the above embodiments of the present disclosure, the preset second uplink control information is determined in at least one of following manners: the preset second uplink control information is a first one of the at least two second uplink control information carried respectively on the at least two second transmission resources; the preset second uplink control information is a last one of the at least two second uplink control information carried respectively on the at least two second transmission resources; the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

In summary, in the above embodiments of the present disclosure, when the first transmission resource and the at least two second transmission resources overlap in the time domain, the first uplink control information and the at least one second uplink control information are received simultaneously on the first transmission resource. Some embodiments of the present disclosure provide a definite method for receiving uplink control information, thereby ensuring normal operation of the system.

It is to be noted that the apparatus for receiving uplink control information according to some embodiments of the present disclosure is an uplink control information receiving apparatus capable of performing the method for receiving uplink control information described above, and all the embodiments of the uplink control information receiving method described above apply to this receiving apparatus and may achieve the same or similar beneficial effects.

Some embodiments of the present disclosure further provide a computer readable storage medium storing therein a computer program, wherein the computer program is configured to be executed by a processor to implement various processes of the embodiments of the method for receiving uplink control information described above, and may achieve the same technical effects. No detailed description is given here to avoid repetition. The computer readable storage medium is, for example, a read-only memory (ROM), a random access memory (RAM), a magnetic disk, an optic disc, or the like.

It is to be noted that, in this specification, the terms "including", "include" or any other variant thereof are intended to cover non-exclusive inclusion, so that a process, method, article or device including a series of elements includes not only those elements, but also other elements not explicitly listed, or elements inherent to such a process, method, article or device. Without further restrictions, the element preceded by the expression "include a . . . " does not exclude the presence of other identical elements in the process, method, article or device including this element.

Through the description of the above embodiments, those skilled in the art can clearly understand that the method of the above embodiments can be implemented by software plus a necessary general hardware platform, and of course it can also be implemented by hardware, but the former is a better implementation in many cases. Based on such a understanding, the essential parts or those parts contributing to related art of technical solutions of the present disclosure can be embodied in the form of software products, which are stored in a storage medium (such as ROM/RAM, magnetic disk, optic disc) and include several instructions to cause a terminal (which can be a mobile phone, a computer, a server, an air conditioner, or network equipment, etc.) to perform the methods described in various embodiments of the present disclosure.

The embodiments of the present disclosure have been described above with reference to the drawings, but the present disclosure is not limited to the above-mentioned specific embodiments, which are only illustrative and not restrictive. In light of the present disclosure, those of ordinary skill in the art can make many forms without departing from the gist of the present disclosure and the scope of the claims. These forms shall fall within the scope of the present disclosure.

Described above are some embodiments of the present disclosure, and it should be noted that those of ordinary skill in the art can make several improvements and modifications, without departing from the principles described in the present disclosure, and these improvements and modifications should also be deemed as falling within the scope of the present disclosure.

What is claimed is:

1. A method for transmitting uplink control information, comprising:
   determining a first transmission resource for first uplink control information and second transmission resources for second uplink control information; and
   when the first transmission resource overlaps with at least two of the second transmission resources in a time domain, transmitting the first uplink control information and at least one of the second uplink control information simultaneously on the first transmission resource; wherein the at least one of the second uplink control information is at least one of uplink control information carried on the at least two second transmission resources that overlap with the first transmission resource in the time domain,
   wherein the transmitting the first uplink control information and at least one of the second uplink control information simultaneously on the first transmission resource comprises:
      transmitting the first uplink control information and at least two second uplink control information carried respectively on the at least two second transmission resources simultaneously on the first transmission resource; or
      transmitting the first uplink control information and preset second uplink control information of at least two second uplink control information carried respectively on the at least two second transmission resources simultaneously on the first transmission resource.

2. The method according to claim 1, wherein, prior to the transmitting the first uplink control information and at least one of the second uplink control information simultaneously on the first transmission resource, the method further comprises:
   determining that the first uplink control information and the second uplink control information are to be transmitted simultaneously.

3. The method according to claim 1, wherein the first uplink control information is hybrid automatic repeat request-ACK information, channel state information or a scheduling request; the second uplink control information is hybrid automatic repeat request-ACK information, channel state information or a scheduling request.

4. The method according to claim 1, wherein the preset second uplink control information is determined in at least one of following manners:
   the preset second uplink control information is a first one of the at least two second uplink control information carried respectively on the at least two second transmission resources;

the preset second uplink control information is a last one of the at least two second uplink control information carried respectively on the at least two second transmission resources;

the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

5. A terminal, comprising a transceiver, a storage, a processor and a computer program stored in the storage and configured to be executed by the processor; wherein the processor is configured to read the computer program from the storage to implement steps in the method for transmitting uplink control information according to claim 1.

6. The terminal according to claim 5, wherein the processor is further configured to:

determine that the first uplink control information and the second uplink control information are to be transmitted simultaneously.

7. The terminal according to claim 5, wherein the first uplink control information is hybrid automatic repeat request-ACK information, channel state information or a scheduling request; the second uplink control information is hybrid automatic repeat request-ACK information, channel state information or a scheduling request.

8. The terminal according to claim 5, wherein the preset second uplink control information is determined in at least one of following manners:

the preset second uplink control information is a first one of the at least two second uplink control information carried respectively on the at least two second transmission resources;

the preset second uplink control information is a last one of the at least two second uplink control information carried respectively on the at least two second transmission resources;

the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

9. A method for receiving uplink control information, comprising:

determining a first transmission resource for first uplink control information and second transmission resources for second uplink control information; and when the first transmission resource overlaps with at least two of the second transmission resources in a time domain, receiving the first uplink control information and at least one of the second uplink control information simultaneously on the first transmission resource; wherein the at least one of the second uplink control information is at least one of uplink control information carried on the at least two second transmission resources that overlap with the first transmission resource in the time domain, wherein the receiving the first uplink control information and at least one of the second uplink control information simultaneously on the first transmission resource comprises:

receiving the first uplink control information and at least two second uplink control information carried respectively on the at least two second transmission resources simultaneously on the first transmission resource; or receiving the first uplink control information and preset second uplink control information of at least two second uplink control information carried respectively on the at least two second transmission resources simultaneously on the first transmission resource.

10. The method according to claim 9, wherein, prior to the receiving the first uplink control information and at least one of the second uplink control information simultaneously on the first transmission resource, the method further comprises:

determining that the first uplink control information and the second uplink control information are to be transmitted simultaneously.

11. The method according to claim 9, wherein the first uplink control information is hybrid automatic repeat request-ACK information, channel state information or a scheduling request; the second uplink control information is hybrid automatic repeat request-ACK information, channel state information or a scheduling request.

12. The method according to claim 9, wherein the preset second uplink control information is determined in at least one of following manners:

the preset second uplink control information is a first one of the at least two second uplink control information carried respectively on the at least two second transmission resources;

the preset second uplink control information is a last one of the at least two second uplink control information carried respectively on the at least two second transmission resources;

the preset second uplink control information is a second uplink control information having the highest priority among the at least two second uplink control information carried respectively on the at least two second transmission resources; and the preset second uplink control information is second uplink control information satisfying a processing latency among the at least two second uplink control information carried respectively on the at least two second transmission resources.

13. A base station, comprising a transceiver, a storage, a processor and a computer program stored in the storage and configured to be executed by the processor, wherein the processor is configured to read the computer program from the storage to implement steps in the method for receiving uplink control information according to claim 9.

14. The base station according to claim 13, wherein the processor is further configured to:

determine that the first uplink control information and the second uplink control information are to be transmitted simultaneously.

15. The base station according to claim 13, wherein the first uplink control information is hybrid automatic repeat request-ACK information, channel state information or a scheduling request; the second uplink control information is hybrid automatic repeat request-ACK information, channel state information or a scheduling request.

16. The base station according to claim 13, wherein the preset second uplink control information is determined in at least one of following manners:
- the preset second uplink control information is a first one of the at least two second uplink control information carried respectively on the at least two second transmission resources;
- the preset second uplink control information is a last one of the at least two second uplink control information carried respectively on the at least two second transmission resources;
- the preset second uplink control information is a second uplink control information having the highest priority among the at least two second uplink control information carried respectively on the at least two second transmission resources; and
- the preset second uplink control information is second uplink control information satisfying a processing latency among the at least two second uplink control information carried respectively on the at least two second transmission resources.

* * * * *